United States Patent Office 2,734,831
Patented Feb. 14, 1956

2,734,831
METHOD OF FINISHING OPEN-GRAINED POROUS WOOD AND ARTICLE PRODUCED THEREBY

Bjorn Eric Larsson, Philadelphia, Pa., assignor to E. I. du Pont de Nemours and Company, Wilmington, Del., a corporation of Delaware No Drawing. Application May 12, 1955, Serial No. 507,977

11 Claims. (Cl. 117—63)

This invention relates to wood finishing and more particularly to a process of finishing open-grained porous woods to produce coatings characterized by improved resistance to marring, chipping and loss of adhesion when scratched, and to the resulting products.

This application is a continuation-in-part of my pending application Serial No. 365,243, filed June 30, 1953.

Mahogany, walnut and oak are representative of woods having an open-grained porous structure which must be adequately filled to obtain a smooth finish. Insufficient filling permits subsequently applied liquid finishes to follow the minute contours of the porous surface, and the resulting finish is irregular and rough. Consequently it looks thin and inadequate. Another fault of conventionally filled wood is that finishes applied thereover do not adhere particularly well to the wood substrate, i. e. the dry finish tends to chip or separate from the substrate when scratched with a hard rigid instrument. Furthermore, conventional fillers usually do not completely fill the pores and other surface irregularities of the wood but apparently only bridge over these places, leaving unfilled voids. These voids are believed to contribute to the anchorage or adhesion difficulties of the subsequently applied finishes and to the "pinholes" or tiny eruptions in the finish which are presumably caused by entrapped air, water vapor or solvent vapor emerging through the partially dry finish during the drying step.

It is the broad object of this invention to overcome the above described deficiencies associated with finishing open-grained porous woods, such as mahogany, walnut and oak. A specific object is to significantly improve the adhesion of coating compositions to such open-grained porous wood. Another object is to improve the scratch or mar resistance and toughness of composite finish applied to such open-grained porous wood. A further object is to provide an improved method of filling open-grained porous wood to develop a final finish having improved adhesion, smoothness and scratch or mar resistance. A still further object is to provide a wood finishing process which eliminates "pinholes" and which also minimizes the effort required to obtain a smooth finish. Still another object is to eliminate the step of drying the conventional filler, thereby shortening the overall time required for the finishing process. Other objects will become apparent as the description of the invention proceeds.

These objects are accomplished by applying to the surface of open-grained porous wood an aqueous filler composition comprising finely divided particles of polyvinyl acetate, drying said aqueous composition, applying thereover a coating composition comprising an organic film-forming material and a liquid solvent for said polyvinyl acetate, and drying said coating composition.

In one specific method for providing improved adhesion and scratch resistance in finishes for open-grained porous wood in accordance with this invention, a mahogany panel is stained in a conventional manner and is then "filled" in the novel manner of this invention. "Filling" is accomplished by spraying on the surface of the stained panel a coat of a filler composition containing about 40% by weight of polyvinyl acetate in the form of finely divided particles, about 4% of a coalescing agent or plasticizer, and the balance water, including residual materials present in the polyvinyl acetate dispersion as a result of its method of manufacture. The aqueous filler composition is worked into the pores and other open places in the wood surface by rubbing and wiping with rags, cotton waste or a sponge. A thin wet film of the composition is left on the surface by making final light smoothing strokes across the surface. The aqueous filler composition is permitted to dry at room temperature for about 30 minutes during which time a clear thin film develops on the surface. This film is lightly sanded to remove high spots and other surface irregularities. A conventional colored oil-type pigmented paste wood filler is then applied to enhance the contrast in the grain and to fill the minor depressions left by the reduction in volume of the aqueous filler during drying. The conventional filler is worked into the depressions and the excess is wiped off. Contrary to prior art methods which usually require drying the conventional filler for 4 to 16 hours or more before application of the next coat of finishing material, this invention permits application of the next coat immediately. A wood finish sealer or top coat which may contain any of a variety of film-forming materials, such as ester gum, alkyd resin, or nitrocellulose, is then applied to the panel. This composition must contain a solvent for polyvinyl acetate in sufficient proportion to attack the polyvinyl acetate filler by direct contact or by penetration through the residual deposits of oil-type filler, thereby anchoring the coating to the wood substrate to provide the improved adhesion of this invention. After this critical step is accomplished, the wood finishing system may be considered complete; but for best results one or more additional coats of conventional furniture lacquer or varnish may be applied, dried and otherwise processed in a conventional manner.

The resulting composite wood finish, comprising a filler coat applied from an aqueous dispersion of polyvinyl acetate, has markedly improved adhesion, as indicated by improved resistance to chipping and separating from the wood when scratched.

It is believed that the hydrophilic character of the aqueous polyvinyl acetate filler compositions of this invention permits these compositions to penetrate more thoroughly into the pores and other open places in the wood than the relatively hydrophobic organic solvent-containing compositions commonly used. This penetration is believed to provide an excellent anchoring means whereby subsequently applied solvent-containing compositions are strongly bound to the embedded polyvinyl acetate, thus yielding the vastly improved scratch adhesion claimed in this invention.

The aqueous polyvinyl acetate dispersions employed in this invention are readily available on the open market. Examples of suitable dispersions are "Polyco" 117–H supplied by American Polymer Corporation, "Vinac" XX supplied by Colton Chemical Company, "Elvacet" 81–900 and "Elvacet" 83–1200 supplied by E. I. du Pont de Nemours and Company (Inc.), and "Gelva" S–55 supplied by Shawinigan Products Corporation. Other suitable aqueous polyvinyl acetate dispersions may be prepared according to U. S. Patent 2,227,163 which issued December 31, 1940, to Starck et al., and U. S. Patent 2,444,396 which issued June 29, 1948, to Collins et al. The particle size of the polyvinyl acetate in the dispersions employed in this invention is generally of the order of 0.5 to 3 microns in diameter.

The following examples illustrate this invention but are not intended to be a limitation thereof. Unless otherwise specified, the parts and percentages are by weight.

EXAMPLE 1

An aqueous polyvinyl acetate filter having the following composition was prepared by simply mixing the ingredients and was sprayed on the surface of a stained mahogany panel.

*Aqueous polyvinyl acetate filler*

| | Parts by weight |
|---|---|
| Polyvinyl acetate dispersion | 72.7 |
| Methyl phthalyl ethyl glycollate | 4.0 |
| Water | 23.3 |
| | 100.0 |

The polyvinyl acetate dispersion was "Elvacet" 81-900 Polyvinyl Acetate Emulsion, which is supplied by E. I. du Pont de Nemours and Company (Inc.). It contained about 55% by weight of polyvinyl acetate in water.

The methyl phthalyl ethyl glycollate was "Santicizer" M-17, which is supplied by Monsanto Chemical Company. It served as a coalescing agent and plasticizer in this composition.

This aqueous polyvinyl acetate filler contained about 40% by weight of polyvinyl acetate based on the total, and about 10% by weight of coalescing agent based on the polyvinyl acetate.

The wet deposit of this composition was immediately worked into the surface of the panel with a damp rubber sponge, and the portion remaining on the surface was smoothed out with light strokes.

The composition was allowed to dry at room temperature for about 30 minutes, during which time water evaporated and the dispersed polyvinyl acetate coalesced to a clear film. The surface was scuff-sanded lightly to remove surface irregularities and to provide a smoother substrate for subsequent finishing operations.

A conventional oil-type pigmented wood filler having the following composition was thinned with mineral spirits to brushing consistency and was applied to the surface to fill the remaining voids in the pores and other open places in the surface after coalescence of the polyvinyl acetate and to enhance the color differences in the grain.

*Pigmented paste wood filler (mahogany)*

| | Parts by weight |
|---|---|
| Alkyd resin | 9.2 |
| Raw linseed oil | 2.0 |
| Linseed oil acids | 1.0 |
| Driers—iron, manganese and lead naphthenates | 2.1 |
| Van Dyke brown pigment | 7.5 |
| Amorphous silica pigment | 6.0 |
| Talc pigment | 6.0 |
| Calcium sulfate pigment | 44.4 |
| Mineral spirits | 21.8 |
| | 100.0 |

The alkyd resin was an 8.2% China-wood oil, 61.6% linseed oil modified glyceryl phthalate resin.

After working this conventional pigmented filler into the surface with cotton waste, the excess was carefully wiped off.

Immediately thereafter, without waiting the usual 4 to 16 hours or more for the pigmented filler to dry, a coat of conventional wood sealer having the following composition was sprayed on the surface.

*Wood sealer*

| | Parts by weight |
|---|---|
| Nitrocellulose (¼ second viscosity) | 7.7 |
| Alkyd resin solution | 8.5 |
| Maleic anhydride modified ester gum | 0.7 |
| Blown castor oil | 3.7 |
| Butyl acetate | 16.5 |
| Methyl ethyl ketone | 12.5 |
| Amyl acetate | 5.0 |
| Ethyl alcohol | 3.3 |
| Isopropyl alcohol | 5.8 |
| Butyl alcohol | 4.5 |
| Toluene | 1.5 |
| High solvency petroleum naphtha | 30.3 |
| | 100.0 |

The alkyd resin solution was a 70% solution of a 53% coconut oil modified glyceryl phthalate resin in toluene.

In this composition, the ketone, the acetates, the alcohols and the toluene are solvents for the polyvinyl acetate in the first filling composition which was applied to the panel.

The sealer was air-dried at room temperature for about 1 hour. The resulting film of sealer was about 1 mil thick.

The surface was sanded lightly and a coat of a wood finishing top coat lacquer having the following composition was applied by spraying.

*Wood finishing top coat lacquer*

| | Parts by weight |
|---|---|
| Nitrocellulose (¼ second viscosity) | 11.1 |
| Blown castor oil | 2.7 |
| Di (2-ethylhexyl) phthalate | 2.7 |
| Maleic anhydride modified ester gum | 1.0 |
| Alkyd resin solution | 8.7 |
| Ethyl alcohol | 6.0 |
| Methyl isobutyl ketone | 28.7 |
| Methyl isobutyl carbinyl acetate | 6.8 |
| Amyl alcohol | 3.3 |
| High solvency petroleum naphtha | 25.3 |
| Toluene | 3.7 |
| | 100.0 |

The alkyd resin solution was the same as used in the previously described wood sealer.

The top coat was air-dried overnight at room temperature. The resulting film of top coat was about 2.5 mils thick.

The thus finished mahogany panel was suitable for use as a table top. The composite finishing system was about 4–4.5 mils thick. The finished surface was very smooth, and it was free of irregularities resulting from the surface coating following the contours of the pores and grain lines of the wood. The finished surface was also free of pinholes.

The adhesion of the composite finish to the wood panel, when tested under scratching and marring conditions, was found to have a value of 8 kilograms. The measurement was made by means of a modification of the Zuhr scratch adhesion and mar resistance tester, which was originally developed by the Bell Telephone Laboratories. This testing machine provides a means of rating scratch adhesion or film adherence in terms of the minimum load required to cause removal of the film, the load being applied to a stylus in contact with the film. The unmodified Zuhr tester and its operation are described in detail in the August 1945 issue of Bell Laboratories Record. The standard stylus of the unmodified machine consists of a highly polished chromium plated rod of 0.0625 inch drill stock bent in the shape of a U having an outside diameter of 0.256 inch. For measurement of the adhesion results obtained in this invention, the orthodox U-shaped stylus was replaced with a solid bar stylus designed to measure a higher degree of adhesion for a given load and capable of withstanding greater loads. The modified stylus was formed from .250 inch square Rex AAA tool steel with the planes of the two faces defining the stylus tip being displaced 20° and 60° respectively from the vertical plane corresponding with the shank, said stylus having an effective edge defined by a radius of .125 inch. This modified stylus yields more consistent scratch resistance results which are approximately one-fourth the value of those determined with the standard U-shaped stylus. For example, a 5 kilogram value with the modified stylus is equivalent to about 20 kilograms measured with the standard Zuhr stylus.

For purposes of comparison, another stained mahogany panel was finished in the same way except that a wash coat of the wood sealer thinned with an equal volume of solvent was substituted for the aqueous polyvinyl acetate filler, and the pigmented paste wood filler was air dried for four hours. The resulting finish was a widely accepted type of conventional finish and was about 4 mils thick. This finish followed the pore and contour lines of the wood and therefore appeared to be rough and irregular in comparison with the unusual smooth surface appearance of the new finish illustrated in this example. Furthermore, the finish had a scratch adhesion value of only 2.5 kilograms compared with 8 kilograms for the new finish. The practical significance of this difference is that the new finish does not mar as readily and does not chip or lose adhesion under scratching conditions which mutilate the conventional type of finish.

EXAMPLE 2

The process of Example 1 was repeated on another stained mahogany panel, except for substituting a single material for the separate wood sealer and wood finishing top coat lacquer employed in that example.

The substitute material had the following composition:

*Wood sealer and top coat*

| | Parts by weight |
|---|---|
| Nitrocellulose (¼ second viscosity) | 13.5 |
| Triethylene glycol dimethacrylate monomer | 13.5 |
| Ethyl alcohol | 17.7 |
| Ethyl acetate | 22.2 |
| Butyl acetate | 19.3 |
| Toluene | 13.5 |
| Cobalt nitrate hexahydrate | 0.3 |
| | 100.0 |

In this composition, the alcohol, the toluene and the acetates are solvents for the polyvinyl acetate in the first filling composition which was applied to the panel.

This composition was applied by spraying and was force-dried by heating the panel in an oven at about 130° F. for 1 hour, during which the triethylene glycol dimethacrylate was polymerized. The resulting coating was about 1 mil thick.

A thick top coat of this same composition was then applied by spraying, and the panel was again heated for 1 hour at 130° F. The resulting film of top coat was about 3 mils thick.

The composite finish on the panel was about 4.5–5 mils thick. The finished surface had an excellent appearance similar to the product of Example 1 and was unusually transparent. The scratch adhesion value was 10 kilograms according to the previously described test.

EXAMPLE 3

The process of Example 1 was repeated on another stained mahogany panel, except for substituting a different material for the wood finishing top coat lacquer. The substitute material had the following composition:

*Top coat finish*

| | Parts by weight |
|---|---|
| Urea formaldehyde resin solution | 33.0 |
| Styrenated alkyd resin solution | 48.5 |
| Ethyl acetate | 2.0 |
| Xylene | 15.5 |
| Octyl acid phosphate | 1.0 |
| | 100.0 |

The urea formaldehyde resin solution was a 60% solution in butyl alcohol of a butylated urea formaldehyde condensate prepared in accordance with U. S. Patent 2,191,957, which issued to Edgar et al. February 27, 1940.

The styrenated alkyd resin solution was a 45% solution in xylene of a 25% styrene, 35% dehydrated castor oil modified glyceryl phthalate resin prepared in accordance with Canadian Patent 479,656, which issued to Cadwell et al. December 25, 1951.

This top coat finish was applied by spraying and was dried by heating the panel in an oven at 150° F. for 1 hour. The resulting film was about 2.5 mils thick.

The composite finish on the panel was about 4–4.5 mils thick. The finished surface had an excellent appearance, similar to the product of Example 1, and a scratch adhesion value of 8 kilograms.

For purposes of comparison, another stained mahogany panel was finished in the same way except that a wash coat of the wood sealer thinned with an equal volume of a solvent was substituted for the aqueous polyvinyl acetate filler and the pigmented paste wood filler was air dried for four hours. The resulting finish was a widely accepted type of conventional finish and was about 4 mils thick. It had a scratch adhesion value of only 3 kilograms in comparison with 8 kilograms for the new finish illustrated in this example.

EXAMPLE 4

An unstained mahogany panel was finished with the following system:

*Filler*

A coat of the aqueous polyvinyl acetate dispersion used in preparing the aqueous polyvinyl acetate filler of Example 1 was applied by brushing, and worked into the surface as in Example 1. The composition was air dried for 15 minutes.

A second coat of the same dispersion was then applied, followed by force drying for 30 minutes at 130° F., which produced a clear coalesced film of the polyvinyl acetate filler.

*Sealer and top coat*

Two coats of the wood sealer and top coat of Example 2 were applied and dried as in that example.

The finished surface had the same excellent appearance and scratch adhesion as the product of Example 2.

In further comparative tests, it was observed that organic solvent solutions of polyvinyl acetate, when substituted for the aqueous polyvinyl acetate dispersion type filler compositions employed in this invention, failed to produce the previously described marked improvement in mar resistance and scratch adhesion.

EXAMPLE 5

The following is a formula for an aqueous polyvinyl acetate wood filler of this invention which is particularly easy to apply by spraying, and may be substituted for the corresponding aqueous filler compositions in the foregoing examples.

| | Parts by weight |
|---|---|
| Polyvinyl acetate dispersion | 32.0 |
| Dibutyl phthalate | 2.0 |
| Methyl cellulose (1500 centipoise viscosity) | 0.6 |
| Polyoxyethylene sorbitan monolaurate | 0.3 |
| Toluene | 5.0 |
| Water | 60.1 |
| | 100.0 |

The polyvinyl acetate dispersion was the same as that used in preparing the aqueous filler of Example 1.

This aqueous polyvinyl acetate filler contained 17.6% polyvinyl acetate based on the total, and about 11% coalescing agent (dibutyl phthalate) based on the polyvinyl acetate.

EXAMPLE 6

The following is a formula for another aqueous polyvinyl acetate wood filler of this invention which contains about 5.5% of polyvinyl acetate by weight based on the total composition. It is particularly adapted for use in filling fine-grained wood.

| | Parts by weight |
|---|---|
| Polyvinyl acetate dispersion (same as used in Example 1) | 10.0 |
| Dibutyl phthalate | 0.6 |
| Methyl cellulose (1500 centipoise viscosity) | 1.0 |
| Polyoxyethylene sorbitan monolaurate | 0.1 |
| Toluene | 2.0 |
| Water | 86.3 |
| | 100.0 |

The foregoing examples illustrate a wide variety of composite finishing systems for application over open-grained porous woods treated with an aqueous polyvinyl acetate filler composition. It is to be understood that the specific ingredient composition of any of the many conventional wash coats, sealers, pigmented fillers and top coats employed as illustrative materials in the examples is not critical, provided that the liquid coating composition applied over the polyvinyl acetate-filled surface contains a solvent for the polyvinyl acetate.

Solvents for polyvinyl acetate are, for example, acetone, methyl ethyl ketone, methyl isobutyl ketone, isophorone, cyclohexanone, methyl acetate, ethyl acetate, propyl acetate, isopropyl acetate, butyl acetate, isobutyl acetate, amyl acetate, methyl alcohol, ethyl alcohol, butyl alcohol, isobutyl alcohol, propyl alcohol, isopropyl alcohol, diacetone alcohol, ethylene glycol monoethyl ether, benzene, toluene, trichloroethylene, dioxane, ethylene dichloride, nitromethane, tetrahydrofurane, chlorobenzene, ethyl benzene and carbon tetrachloride.

The examples disclose, as film-forming materials in the various coating compositions applied over the polyvinyl acetate-filled wood, ¼ second viscosity nitrocellulose, vegetable oils, drying and non-drying oil alkyd resins, modified ester gum, triethylene glycol dimethacrylate, urea formaldehyde resin and styrenated oil-modified alkyd resin. Other suitable film-forming materials include, for instance, other viscosity grades of nitrocellulose commonly used in furniture finishes, natural resins such as rosin and shellac, unmodified ester gum, phenol formaldehyde type resins, melamine formaldehyde type resins, acrylic ester resins such as polymethyl methacrylate and polybutyl methacrylate, polyester resins and oleoresinous varnishes. The coating compositions may contain pigment or other material for coloring or flatting purposes.

Mahogany was used in the examples merely for convenience in comparing directly the results of various finishing systems. This invention provides the same degree of improvement on other open-grained porous woods, such as walnut and oak. When woods other than mahogany are used, colored stains and pigmented fillers which are particularly suitable for such woods should be used. Although the bare mahogany was stained in Examples 1–3, staining is optional as a means of coloring the wood to suit the tastes of the consumer. Staining can also be accomplished after application of the polyvinyl acetate filler composition.

The polyvinyl acetate content of the aqueous polyvinyl acetate filler composition may vary over a wide range depending on the porosity of the wood being filled and the method of application. Concentrations as low as 5% by weight based on the total composition are particularly adaptable to spray application on fine-grained wood. Concentrations as high as 60% by weight are particularly adaptable to brushing or other manual application on coarse-grained wood. One or more coats of a filler composition having a polyvinyl acetate content within the range of 5%–60% may be substituted for the corresponding composition in the foregoing examples. The preferred range is 15%–40% of polyvinyl acetate by weight based on the total aqueous filler composition.

The aqueous polyvinyl acetate filler composition may also contain other constituents such as hydrophilic bodying agents and surface active agents. Colored pigments or dyes may be used in the composition to alter the natural color contrast in the grain of the wood.

When the aqueous polyvinyl acetate filler composition is to be dried by heating, such as at 120° F. or higher, a coalescing agent for the polyvinyl acetate is usually not required to produce a clear film, but when it is to be air dried, a coalescing agent should be used. It has been found that 1%–15% of coalescing agent, based on the polyvinyl acetate, is satisfactory. The preferred amount is about 5%–10%.

The term "coalescing agent," as used herein, means an organic liquid which, during the drying step, causes the polyvinyl acetate particles to join together and form a clear film, as contrasted with a discontinuous deposit of particles. Some coalescing agents, such as ethylene glycol monobutyl ether and ethylene glycol monoethyl ether acetate, may evaporate during the drying step; others, such as the well known plasticizers for polyvinyl acetate, may remain in the film after drying.

Suitable coalescing agents are, for instance, ethylene glycol monobutyl ether, ethylene glycol monoethyl ether acetate, dibutyl phthalate, di(2-ethylhexyl) phthalate, dibutyl tartrate, tributyl phosphate, tricresyl phosphate, tri(2-ethylhexyl) phosphate, tri(chloroethyl) phosphate, triethylene glycol di(2-ethylbutyrate), triethylene glycol di(2-ethylhexoate), polyethylene glycol di(2-ethylhexoate), diethylene glycol di(2-ethylbutyrate) butyl phthalyl butyl glycollate and dibutyl sebacate. Any of such materials or any combination thereof may be substituted for all or part of the coalescing agents shown in the examples.

It will be obvious to those skilled in the art of wood finishing that the invention is not limited with respect to the application and drying methods disclosed in the examples, since these merely illustrate a few of the wide variety of methods commonly employed in the art to apply and to dry or cure furniture finishes. For instance, it is preferred to work the polyvinyl acetate filler into the surface to get the maximum filling effect; but suitable results are obtained by merely applying this composition, without the subsequent step of working it into the surface. Also, the examples show the elimination of the usual step of drying the conventional oil-type pigmented paste filler. While this is a preferred embodiment of the invention, the conventional filler may be dried if desired.

This invention provides novel methods of finishing open-grained porous woods, such as mahogany, walnut and oak, to yield composite finishes having greatly improved mar resistance and scratch adhesion. Wood finished by these methods is particularly useful in the furniture and cabinet making industries, where marring and scratching are encountered during manufacture, shipment, exhibition in show rooms, and use by the ultimate consumer.

It is apparent that many widely different embodiments of this invention can be made without departing from the spirit and scope thereof; and, therefore, it is not intended to be limited except as indicated in the appended claims.

I claim:

1. The process of producing improved adhesion and scratch resistance in a finishing system on open-grained porous wood which comprises applying to the surface of said wood an aqueous filler composition comprising 5%–60% of finely divided particles of polyvinyl acetate, by weight based on the total composition, drying said aqueous composition, applying thereover a coating composition comprising an organic film-forming material and a liquid organic solvent for said polyvinyl acetate, and drying said coating composition.

2. The process of claim 1 in which said aqueous filler composition contains 15%–40% of polyvinyl acetate, by weight based on the total composition.

3. The process of claim 1 in which said aqueous filler composition contains 1%–15% of coalescing agent by weight based on the polyvinyl acetate.

4. The process of claim 1 in which said aqueous filler composition contains 5%–10% of coalescing agent by weight based on the polyvinyl acetate.

5. The process of claim 3 in which said coalescing agent is methyl phthalyl ethyl glycollate.

6. The process of claim 3 in which said coalescing agent is dibutyl phthalate.

7. The process of claim 1 in which said coating composition comprises an organic film-forming material selected from the class consisting of nitrocellulose, vegetable oils, drying oil alkyd resins, non-drying oil alkyd resins, styrenated alkyd resins, ester gum, triethylene glycol dimethacrylate, urea formaldehyde resins, phenol formaldehyde resins, melamine formaldehyde resins, acrylic ester resins, polyester resins, natural resins, and oleoresinous varnishes.

8. The process of claim 1 in which the wood is stained.

9. The process of producing improved adhesion and scratch resistance in a finishing system on open-grained porous wood, which comprises (1) applying to the surface of said wood an aqueous filler composition comprising (a) 5%–60% of finely divided particles of polyvinyl acetate, by weight based on the total composition, and (b) 1%–15% of coalescing agent therefor, by weight based on the polyvinyl acetate, (2) drying said aqueous composition, (3) applying an oil-type pigmented paste wood filler, (4) applying a sealer coating composition comprising an organic film-forming material and a liquid organic solvent for said polyvinyl acetate, (5) drying said sealer coating composition, (6) applying a top coat coating composition comprising an organic film-forming material, and (7) drying said top coat coating composition.

10. The process of claim 9 in which said sealer coating composition and said top coat coating composition comprise an organic film-forming material selected from the class consisting of nitrocellulose, vegetable oils, drying oil alkyd resins, non-drying oil alkyd resins, styrenated alkyd resins, ester gum, triethylene glycol dimethacrylate, urea formaldehyde resins, phenol formaldehyde resins, melamine formaldehyde resins, acrylic ester resins, polyester resins, natural resins, and oleoresinous varnishes.

11. An article of manufacture comprising open-grained porous wood having an adherent, scratch resistant finish prepared by applying to the surface of said wood an aqueous filler composition comprising 5%–60% of finely divided particles of polyvinyl acetate, by weight based on the total composition, drying said aqueous composition, applying thereover a coating composition comprising an organic film-forming material and a liquid organic solvent for said polyvinyl acetate, and drying said coating composition.

References Cited in the file of this patent

UNITED STATES PATENTS

| Number | Name | Date |
|---|---|---|
| 2,292,468 | Oeffinger et al. | Aug. 11, 1942 |
| 2,334,236 | Arnold | Nov. 16, 1943 |
| 2,350,818 | Rees | June 16, 1944 |
| 2,402,331 | Kvalnes | June 18, 1946 |
| 2,630,395 | McCullough et al. | Mar. 3, 1953 |